Patented Mar. 19, 1940

2,194,246

UNITED STATES PATENT OFFICE 2,194,246

ENAMELS AND GLAZES AND A METHOD OF PRODUCING THE SAME

Carl Oberländer, Hamburg, and Fritz Hermann Zschacke, Berlin-Wilmersdorf, Germany, assignors to Sioto G. m. b. H., Hamburg, Germany, a corporation of Germany No Drawing. Application May 20, 1936, Serial No. 80,806. In Germany May 22, 1935

10 Claims. (Cl. 106—36.2)

This invention relates to the art of producing enamels, glazes and the like, and more particularly to means whereby the quality of said enamels, glazes and the like is improved, and a method of producing such means.

An object of this invention consists in providing a product that enables to completely or partly substitute boric acid and lead oxide in enamels, glazes and the like without disadvantageously influencing the properties of such coatings in physical, chemical or technical respect.

It has been found that this is achieved by using a magnesium borosilicate that is added to the enamel frit in pulverized or granulated form.

The composition of such a magnesium borosilicate preferably varies within the following limits:

|  | Per cent |
| --- | --- |
| Silicic acid | 30–50 |
| Boric acid | 10–30 |
| Magnesium oxide | 15–35 |
| Alkali compounds | 10–20 |

Of course, small amounts of other components of said frit as they are introduced by the starting materials themselves or separately, for instance, also coloring matter and the like, may be included into said composition. Furthermore, under certain circumstances a content of alumina and the like up to 8% has proved to be of advantage.

A magnesium borosilicate according to this invention may be produced, for instance, by mixing and fusing the corresponding starting materials such as, for instance, sand, feldspar, borax, magnesite and the like.

Of course, it is also possible to heat the mixture of the crude materials which previously may be pressed somewhat together, to temperatures whereby fusing does not yet take place but whereby the mixture is converted into a sintered mass.

Furthermore, one may produce the magnesium borosilicates by way of precipitating the same from solutions of the component materials, i. e. by wet processes. The magnesium borosilicate obtained according to these methods is pulverized until it has acquired the desired fineness, and is then added to the enamel, glaze or the like batch.

It has been found that a useful product is obtained only when combining magnesia, silicic acid, boric acid and alkalies within the limits stated above; for, below or above these limits there are produced products that either do not fuse anymore at the usual temperatures or that, on cooling, separate out or crystallize.

It is already known to introduce magnesia itself or in the form of its double compounds, such as, for instance, in the form of spinels, into enamels or glazes; but all these products did not give any proper result especially when larger amounts of magnesium were added; for, either the enamels were discolored, or the turbidifying power of the turbidifying agents added thereto was considerably diminished by magnesium oxide, or crystalline dull enamels and glazes were obtained that showed a strong tendency to cause capillary cracks, scaling off and the like.

Furthermore, an introduction of larger amounts of magnesia into enamels is impeded by the low power of dissolution of the latter with respect to magnesium oxide or magnesium silicates. All these disadvantages and shortcomings are overcome according to this invention by introducing the magnesia not as hitherto has been done, as such but by using a magnesium borosilicate obtained as described above, for instance, by previously fusing boric acid, silicic acid and magnesia preferably in the presence of alkalies.

By means of the combination of compounds as claimed and described herein the further advantage is achieved that glazes having a very low coefficient of expansion can be obtained, whereby up to four parts of borax may be substituted by one part of magnesium borosilicate. It is surprising to say that by these means the enamels fused with such an addition show a considerably greater turbidity than enamels wherein the boric acid was added in the form of borax although in both enamels composition as well as content of turbidifying agent were the same. Thus, besides saving borax a further saving of turbidifying agents is achieved. This is the more astonishing as the granules of the product according to this invention are not turbid per se but highly transparent. When using other magnesium compounds than the borosilicate claimed, for instance spinels, this phenomenon was not observed, on the contrary is most cases it was necessary to increase the amount of turbidifying agent added.

In case it is desired to neutralize the decrease of the coefficient of expansion caused by the addition of magnesium borosilicate, as it might be necessary for certain purposes, one may add small amounts of sodium carbonate to the batch; for, it is known that sodium compounds have a strongly increasing effect upon the coefficient of expansion. By these means it is achieved that the temperature of burning is the same as in the case of enamels without the borax substitute described and claimed herein. Since on the other hand the magnesium borosilicate has a comparatively low softening point one may produce therewith enamels with a very low coefficient of expansion and technically suitable burning temperatures. Such enamels hitherto could not be produced at all. At the same time the substitution of the borax by magnesium borosilicate represents a considerable reduction in price of the enamels and allows a substantial decrease of the consumption of borax.

A further advantage that has been observed on partly or completely substituting borax by magnesium borosilicate consists in the fact that the chemical properties, especially the resistance to acids of enamels made herewith are considerably improved. This enables one to produce acid resistant enamels at a lower burning temperature than was heretofore possible.

Furthermore, by using the magnesium borosilicate according to this invention the comparatively expensive lead oxide may be partly or completely substituted in enamels, glazes and the like without substantially impairing the properties of the same. As stated above, also in this case the decrease of the coefficient of expansion caused by the borax substitute according to this invention is preferably neutralized by a small addition of soda or potash; but this invention enables one also to produce such types of enamels, glazes and the like that have a very low coefficient of expansion.

It has to be pointed out that the same effect is not obtained when adding the magnesium borosilicate in the form of its cured materials to the batch instead of the sintered or fused or otherwise combined product; for, when adding the uncombined crude materials, masses are obtained that are either infusible or melt only at extraordinarily high temperatures.

Especially suitable products are obtained on adding compounds of fluorine to said magnesium borosilicates. Thereby the thermal reaction of the process of formation is preferably carried out in such a manner that magnesium silicofluorides and, depending upon the amount of alkali compounds present, alkali fluorides are formed besides the magnesium borosilicates. By this means a product is obtained that shows an extraordinarily low melting point as compared with the magnesium borosilicates mentioned above. On account of its low softening point as well as its especially high power of dissolution such a product approaches the typical properties of pure borax to such an extent that the boric acid content of the enamels, glazes and the like may be decreased still more than with the magnesium borosilicates alone. On account of these excellent properties the fluorine containing magnesium borosilicate is capable of completely substituting borax and the other water soluble ingredients of the ground-enamel batch. Thereby it is possible in the art of making enamels to use a not-fused frit that contains only a small fraction of the hitherto necessary amount of boric acid, without being forced to increase the burning temperature of the enamel, in spite of the considerable saving of valuable crude materials effected thereby.

The fluorine may be introduced into the product described and claimed herein by adding silicofluorides of alkali metals, fluorspar, sodium or potassium fluorides or the like. In case the product shall contain alumina, cryolite may be used as fluorine compound.

The composition of such a magnesium borofluorosilicate is quite similar to that of the magnesium borosilicate mentioned above and preferably varies within the following limits:

|  | Per cent |
|---|---|
| Silicic acid | 30–50 |
| Boric acid | 10–30 |
| Magnesium oxide | 4–35 |
| Alkali compounds | 10–20 |
| Calcium oxide | 0–10 |
| Fluorine | 1– 7 |

In contrast to other fluorine containing frits such a product does not turbidify the glass, glazes, enamels and the like, and, hence, may be used without any difficulty for making transparent goods. Opaque enamels can be obtained by adding up to 8% of alumina to said product.

A further advantage is achieved by using such fluorine containing preparations, as the crude materials yielding the boric acid may be introduced into the composition in the form of its naturally occurring compounds; for, the greatest part of the iron impurities of the same are volatilized by the fluorine present.

The following examples serve to illustrate the invention without, however, limiting the same to them; they show the effect of an addition of magnesium borosilicate to usual enamel batches whereby savings of borax amounting to 50% and more are observed:

*Example 1*

A suitable ground enamel consists of—

|  | Without magnesium borosilicate | With magnesium borosilicate |
|---|---|---|
|  | Parts | Parts |
| Borax | 45.8 | 20.0 |
| Feldspar | 30.0 | 30.0 |
| Quartz | 11.3 | 11.3 |
| Sodium carbonate | 6.0 | 15.0 |
| Fluorspar | 4.0 | 4.0 |
| Sodium nitrate | 1.7 | 1.7 |
| Cobalt oxide | 0.36 | 0.36 |
| Magnesium borosilicate |  | 17.0 |

This shows that the same or an even better result is obtained when substituting 25.8 parts of borax by 17.0 parts of magnesium borosilicate and 9 parts of sodium carbonate.

*Example 2*

A suitable covering enamel consists of:

|  | Without magnesium borosilicate | With magnesium borosilicate |
|---|---|---|
|  | Parts | Parts |
| Borax | 28 | 14 |
| Feldspar | 40 | 40 |
| Quartz | 11 | 11 |
| Cryolite | 17 | 14 |
| Sodium carbonate |  | 5 |
| Sodium nitrate | 4 | 4 |
| Magnesium borosilicate |  | 9 |

Thus, the same or an even better result is obtained when substituting 14 parts of borax and 3 parts of cryolite by adding 9 parts of magnesium borosilicate and 5 parts of sodium carbonate.

Of course many changes and variations in the composition of the magnesium boro- and magnesium boro-fluorosilicates, in the manner of producing the same and their use, in the compounding with other materials and the like, may be made by those skilled in the art in accordance with the principles set forth herein and in the claims annexed hereto.

What we claim is:

1. A preparation for improving enamels, glazes and the like, comprising a magnesium borosilicate having substantially the following composition:

| | Per cent |
|---|---|
| Silicic acid | 30–50 |
| Boric acid | 10–30 |
| Magnesium oxide | 15–35 |
| Alkali compounds | 10–20 |

2. A preparation according to claim 1 having a further content of alumina and other ingredients of enamels, glazes and the like.

3. A preparation for improving enamels, glazes and the like, comprising a magnesium borosilicate containing fluorine and having substantially the following composition:

| | Per cent |
|---|---|
| Silicic acid | 30–50 |
| Boric acid | 10–30 |
| Magnesium oxide | 4–35 |
| Alkali compounds | 10–20 |
| Calcium oxide | 0–10 |
| Fluorine | 1–7 |

4. A preparation according to claim 3 having a further content of alumina and other ingredients of enamels, glazes and the like.

5. A method of producing a preparation for improving enamels, glazes and the like, comprising reacting a magnesium compound, a boron compound, and a silicic acid compound in the presence of an alkali compound so as to produce a magnesium borosilicate having substantially the following composition:

| | Per cent |
|---|---|
| Silicic acid | 30–50 |
| Boric acid | 10–30 |
| Magnesium oxide | 15–35 |
| Alkali compounds | 10–20 |

6. A method of producing a preparation for improving enamels, glazes and the like, comprising reacting a magnesium compound, a boron compound, a silicic acid compound, and a fluorine compound in the presence of an alkali compound so as to produce a magnesium boro-fluorosilicate having substantially the following composition:

| | Per cent |
|---|---|
| Silicic acid | 30–50 |
| Boric acid | 10–30 |
| Magnesium oxide | 4–35 |
| Alkali compounds | 10–20 |
| Calcium oxide | 0–10 |
| Fluorine | 1–7 |

7. A method according to claim 5 wherein the reaction is effected by heating the mixture of the crude materials to sintering.

8. A method according to claim 6 wherein the reaction is effected by heating the mixture of the crude materials to sintering.

9. A method according to claim 5 wherein a naturally occurring boron compound is used.

10. A method according to claim 6 wherein a naturally occurring boron compound is used.

CARL OBERLÄNDER.
F. HERMANN ZSCHACKE.